(12) United States Patent
Hung

(10) Patent No.: US 8,864,089 B2
(45) Date of Patent: Oct. 21, 2014

(54) HOLDING DEVICE

(71) Applicant: Modernsolid Industrial Co., Ltd., Taichung (TW)

(72) Inventor: Chin-Jui Hung, Taichung (TW)

(73) Assignee: Modernsolid Industrial Co., Ltd., Taichung (TW)

( * ) Notice: Subject to any disclaimer, the term of this patent is extended or adjusted under 35 U.S.C. 154(b) by 0 days.

(21) Appl. No.: 13/845,321

(22) Filed: Mar. 18, 2013

(65) Prior Publication Data

US 2014/0145050 A1    May 29, 2014

(30) Foreign Application Priority Data

Nov. 28, 2012  (TW) .............................. 101223042 A

(51) Int. Cl.
*E04G 3/00* (2006.01)
*F16M 11/04* (2006.01)
*F16M 13/00* (2006.01)

(52) U.S. Cl.
CPC ........... *F16M 13/00* (2013.01); *F16M 2200/08* (2013.01); *F16M 11/041* (2013.01); *Y10S 248/924* (2013.01)
USPC ................. 248/274.1; 248/316.1; 248/122.1; 248/924

(58) Field of Classification Search
USPC ............ 248/274.1, 316.1, 122.1, 176.1, 917, 248/924, 448, 451, 452, 453, 488; 379/446, 379/454, 455
See application file for complete search history.

(56) References Cited

U.S. PATENT DOCUMENTS

| | | | | |
|---|---|---|---|---|
| 2,508,841 | A * | 5/1950 | Schreibman | 211/41.7 |
| 3,076,285 | A * | 2/1963 | Sparkman | 248/448 |
| 4,473,207 | A * | 9/1984 | Nascher | 248/490 |
| 7,611,112 | B2 * | 11/2009 | Lin | 248/274.1 |
| 8,066,241 | B2 * | 11/2011 | Yu et al. | 248/286.1 |
| 8,235,334 | B1 * | 8/2012 | Kobal | 248/122.1 |
| 8,240,628 | B2 * | 8/2012 | Huang | 248/316.1 |
| 8,413,943 | B1 * | 4/2013 | Li | 248/454 |
| 8,469,325 | B2 * | 6/2013 | Yu | 248/316.1 |
| D692,436 | S * | 10/2013 | Hung | D14/447 |
| D697,515 | S * | 1/2014 | Adelman et al. | D14/447 |

* cited by examiner

*Primary Examiner* — Anita M King
(74) *Attorney, Agent, or Firm* — Whyte Hirschboeck Dudek S.C.

(57) ABSTRACT

A holding device includes a base, an upper holding arm unit connected to an upper portion of the base, and a pair of lower holding arm units connected to the base. Each of the lower holding arm units includes a lower holding arm that is connected to the base and that is rotatable between upper and lower positions. Each lower holding arm is movable relative to the base in a sliding direction between an extended position and a contracted position. Each of the lower holding arm units further includes a stop member that extends into the base and that is operable for positioning the lower holding arm relative to the base. The lower holding arm units cooperate with the upper holding arm unit to define a holding space for retaining a display.

11 Claims, 10 Drawing Sheets

HOLDING DEVICE

CROSS-REFERENCE TO RELATED APPLICATION

This application claims priority of Taiwanese Patent Application No. 101223042, filed on Nov. 28, 2012.

BACKGROUND OF THE INVENTION

1. Field of the Invention

The invention relates to a holding device, more particularly to a holding device for a display.

2. Description of the Related Art

Referring to FIG. 1, a conventional holding device 1 for a liquid-crystal display (LCD) 19 is disclosed in Taiwanese Utility Model Patent No. M428694. The conventional holding device 1 includes a plurality of holding members 11 that are adapted for retaining the LCD 19 in a preferred position. However, the holding members 11 are fixed relative to the remaining portion of the holding device 1, such that the conventional holding device 1 merely applies to the LCD 19 of a particular size.

SUMMARY OF THE INVENTION

Therefore, the object of the present invention is to provide a holding device to overcome the aforesaid drawback.

Accordingly, a holding device of the present invention for holding a display includes:

a base;

an upper holding arm unit connected to an upper portion of the base; and a pair of lower holding arm units connected to a lower portion of the base, each of the lower holding arm units including a lower holding arm that is connected to the base and that is rotatable about an axis relative to the base between upper and lower positions, the lower holding arm of one of the lower arm units being moved toward the lower holding arm of the other one of the lower holding arm units during movement from the upper position to the lower position, the lower holding arm being movable relative to the base in a sliding direction transverse to the axis between an extended position to be distal from a center of the base and a contracted position to be proximate to the center of the base, each of the lower holding arm units further including a stop member that extends into the base and that is operable for positioning the lower holding arm relative to the base, the lower holding arm units being adapted for cooperating with the upper arm unit to define a holding space adapted for retaining the display.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
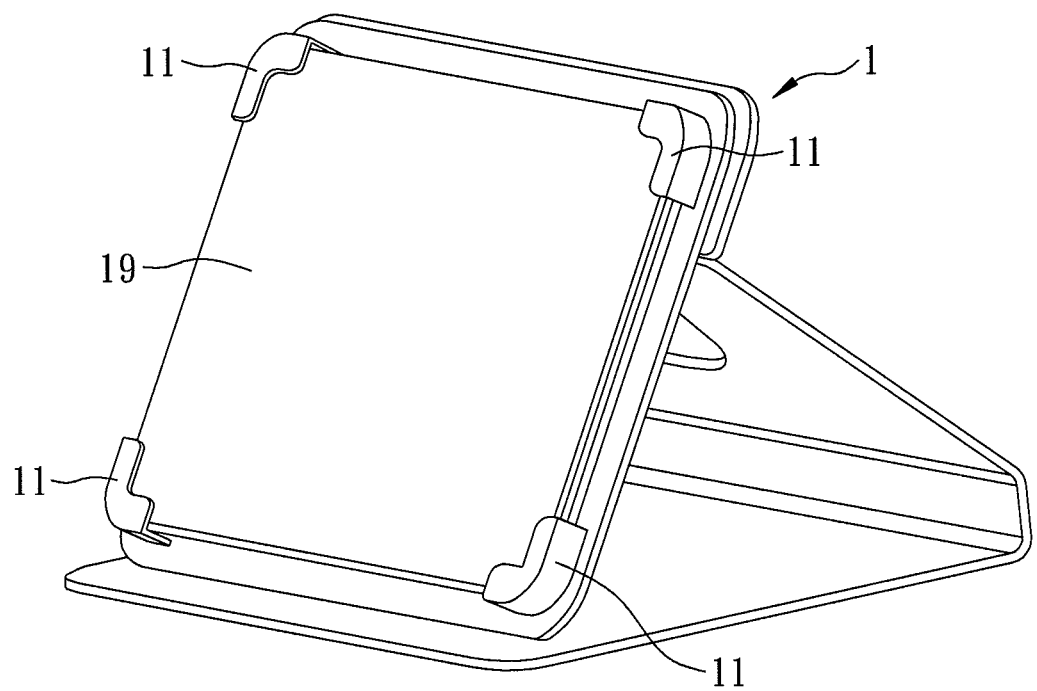
FIG. 1 is a perspective view of a conventional holding device disclosed in Taiwanese Utility Model Patent No. M428694.

Referring to FIGS. 2, 3, 4 and 6, the preferred embodiment of a holding device for holding a display 9 according to the present invention includes a base 2, an upper holding arm unit 3, a pair of lower holding arm units 4, an abutment unit 5, and a cushion unit 6.

The base 2 has upper and bottom portions, and the bottom portion of the base 2 is formed with a pair of adjusting grooves 21. Each of the adjusting grooves 21 has opposite upper and lower ends 211,212.

Figure 9:
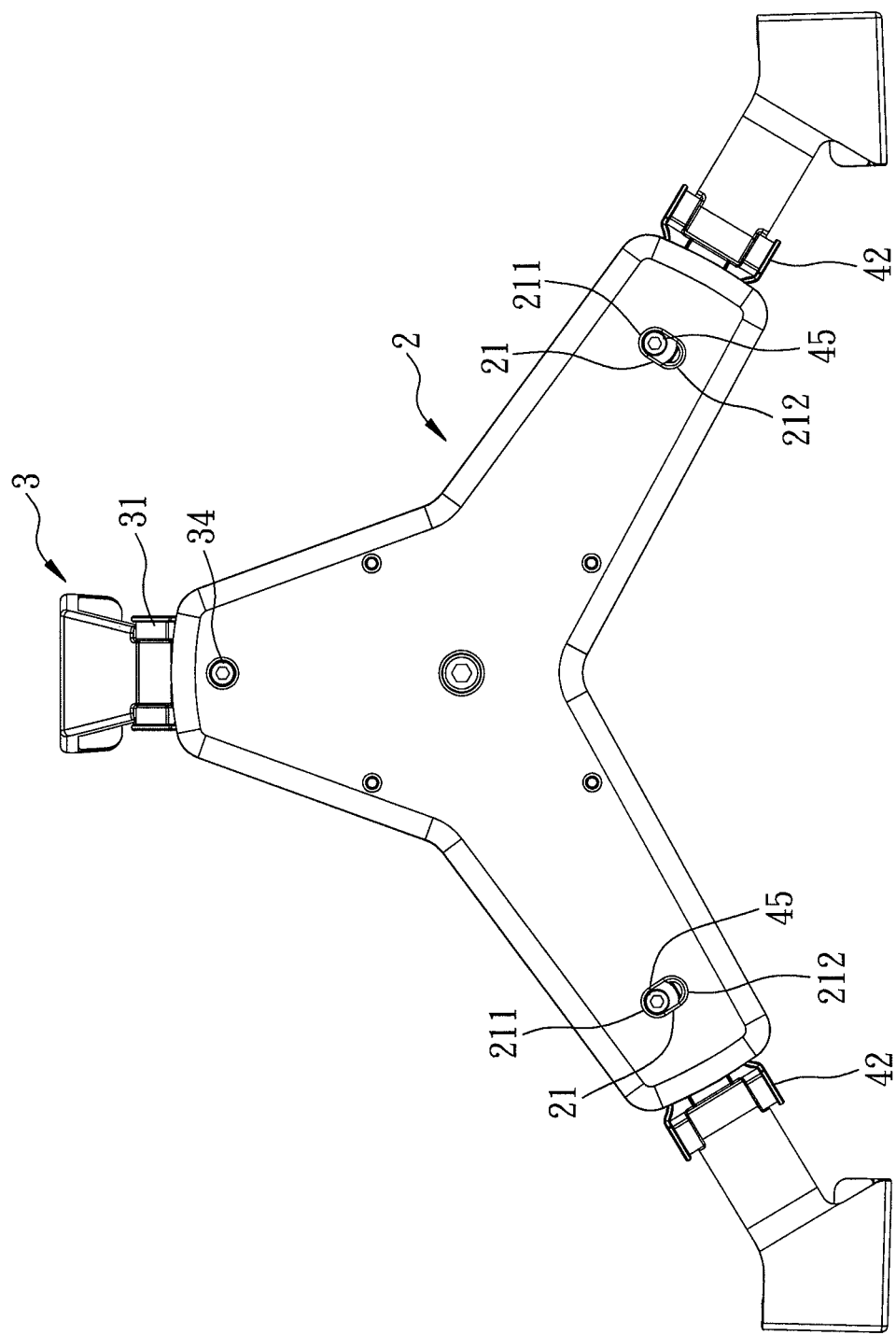
FIG. 9 is a rear view of the preferred embodiment illustrating the lower holding arms are in lower positions.
Figure 10:
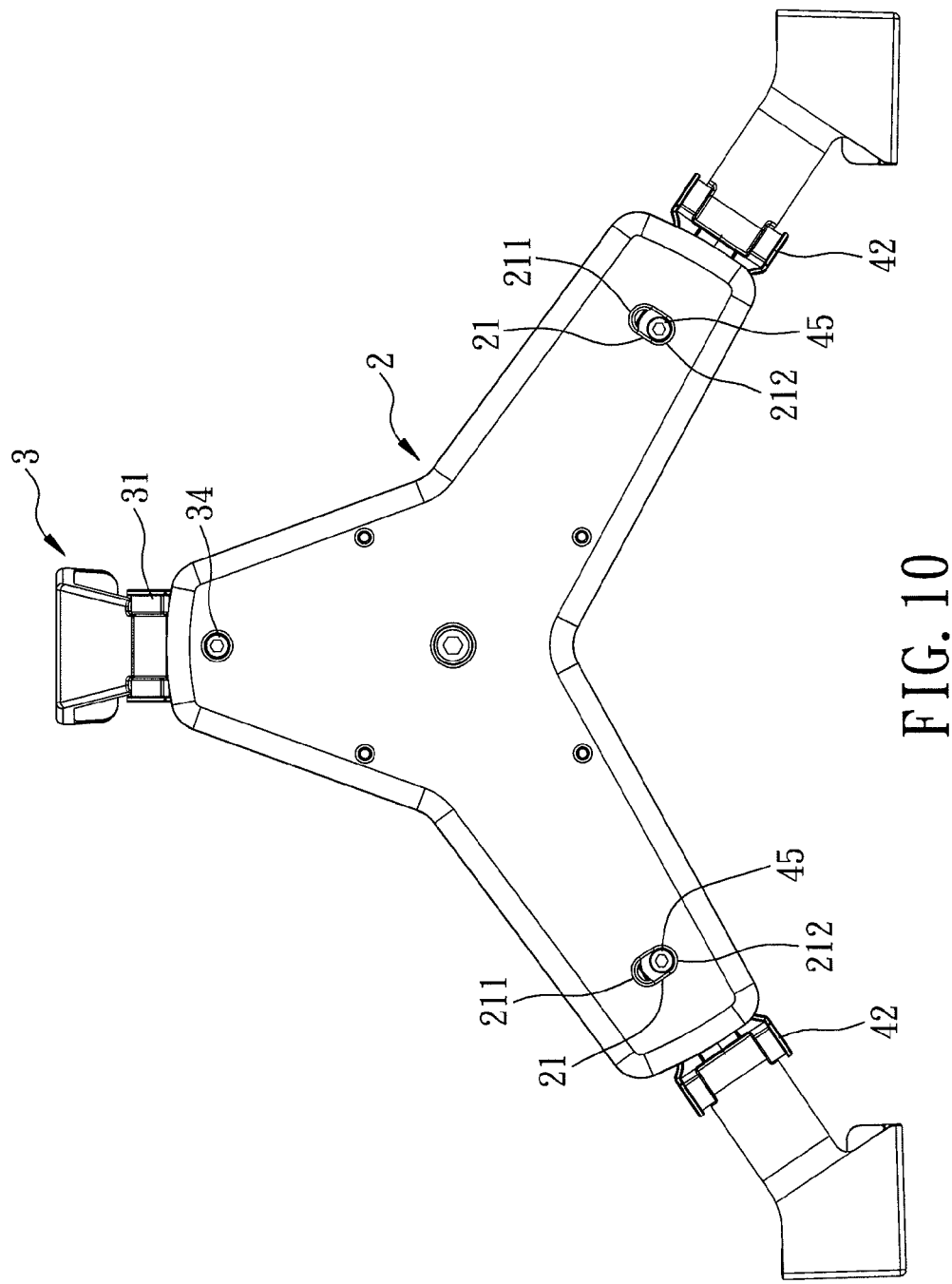
FIG. 10 is another rear view of the preferred embodiment illustrating the lower holding arms are in upper positions.

Each of the lower holding arm units 4 is connected to the lower portion of the base 2 and includes a connecting arm 44, a lower holding arm 42, a holding bracket 43, and a stop member 45. The connecting arm 44 has a securing end rotatably connected to the base 2 and registered with an axis (L1, L2) which extends in a front-rear direction (i.e., the connecting arm 44 is pivotable relative to the base 2), and an engaging portion 441 extending in a sliding direction transverse to the axis (L1, L2). The lower holding arm 42 extends in the sliding direction, and has an engaging part 422 that engages slidably the engaging portion 441 of the connecting arm 44, and that is formed with a limiting groove 421 that extends in the sliding direction. The lower holding arm 42, being connected to the base 2 via the corresponding connecting arm 44, is pivotable about the axis (L1, L2) between an upper position (see FIG. 9) and a lower position (see FIG. 10). The lower holding arm 42 of one of the lower arm units 4 is moved toward the lower holding arm 42 of the other one of the lower holding arm units 4 during movement from the upper position to the lower position. The lower holding arm 42 is also movable relative to the base 2 in the sliding direction between an extended position (see FIG. 7) to be distal from a center of the base 2 and a contracted position (see FIG. 8) to be proximate to the center of the base 2. The stop member 45 extends into through a respective one of the adjusting grooves 21 in the base 2 and the limiting groove 421 in the lower holding arm 42, is operable for positioning the lower holding arm 42 relative to the base 2, and contacts the upper and lower ends 211, 212 of the respective one of the adjusting grooves 21 when the lower holding arm 42 is at the upper and lower positions respectively. The holding bracket 43 is connected to a distal end of the lower holding arm 42 and is forwardly and rearwardly pivotable.

In this embodiment, the engaging portion 441 of the connecting arm 44 of each of the lower holding arm unit 4 and the engaging part 422 of the lower holding arm 42 of each of the lower holding arm unit 4 has a plurality of engaging teeth 4411, 4221. However, the engagement between the connecting arm 44 and the lower holding arm 42 of each of the lower holding arm units 4 is not limited thereto in other embodiments of the present invention.

Referring back to FIG. 2, the upper holding arm unit 3 is connected to the upper portion of the base 2 and includes a connecting arm 33, an upper holding arm 31, a holding bracket 32 and a stop member 34. The connecting arm 33 of the upper holding arm unit 3 has a securing end connected rotatably to the base 2 and registered with an axis (L3), which extends in the front-rear direction (i.e., the connecting arm 33 is pivotable relative to the base 2), and an engaging portion 331 extending in a sliding direction transverse to the axis (L3). The upper holding arm 31 has an engaging part 312 that extends in the sliding direction and that engages slidably the engaging portion 331 of the connecting arm 33, and that is formed with a limiting groove 311 that extends in the sliding direction. The upper holding arm 31 of the upper holding unit 3, being connected to the base 2 via the connecting arm 33, is movable relative to the base 2 in the sliding direction between an extended position (see FIG. 7) to be distal from the center of the base 2 and a contracted position (see FIG. 8) to be proximate to the center of the base 2. The stop member 34 of the upper holding arm unit 3 extends into the upper portion of the base 2 and through the limiting groove 311 of the upper holding arm 31, and is operable for positioning the upper holding arm 31 relative to the base 2. The holding bracket 32 of the upper holding arm unit 3 is connected to a distal end of the upper holding arm 31 and is forwardly and rearwardly pivotable. The upper holding arm unit 3 cooperates with the lower holding arm units 4 to define a holding space 41 (see FIGS. 3 and 6) for retaining the display 9.

In this embodiment, the engaging portion 331 of the connecting arm 33 and the engaging part 312 of the upper holding arm 31 both have a plurality of engaging teeth 3311, 3121. However, the engagement between the connecting arm 33 and the upper holding arm 31 is not limited thereto in other embodiments of the present invention.

In this embodiment, each connecting arm 33, 44 has a distal end connected to the corresponding upper or lower holding arms 31, 42 and formed with a threaded hole. The stop member 34, 45 of each of the upper and lower holding arm units 3, 4 engages threadedly the threaded hole in the distal end of the corresponding connecting arm 33, 44 after extending into the base 2 and passing through the corresponding limiting groove 311, 421. However, the engagement between the stop member 34, 45 and the corresponding connecting arm 33, 44 is not limited thereto in other embodiments of the present invention.

Figure 2:
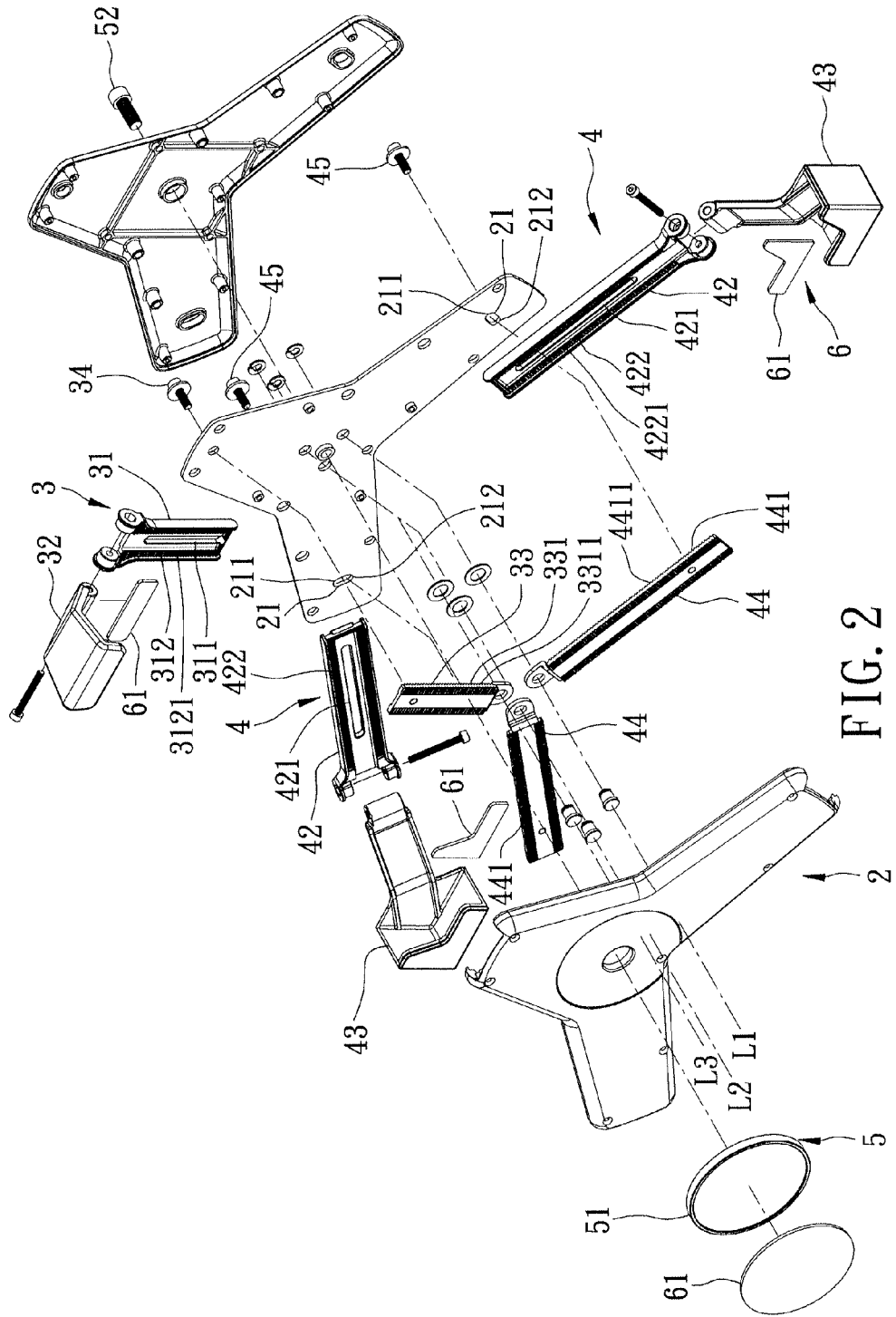
FIG. 2 is an exploded perspective view of the preferred embodiment of a holding device according to the present invention.
Figure 3:
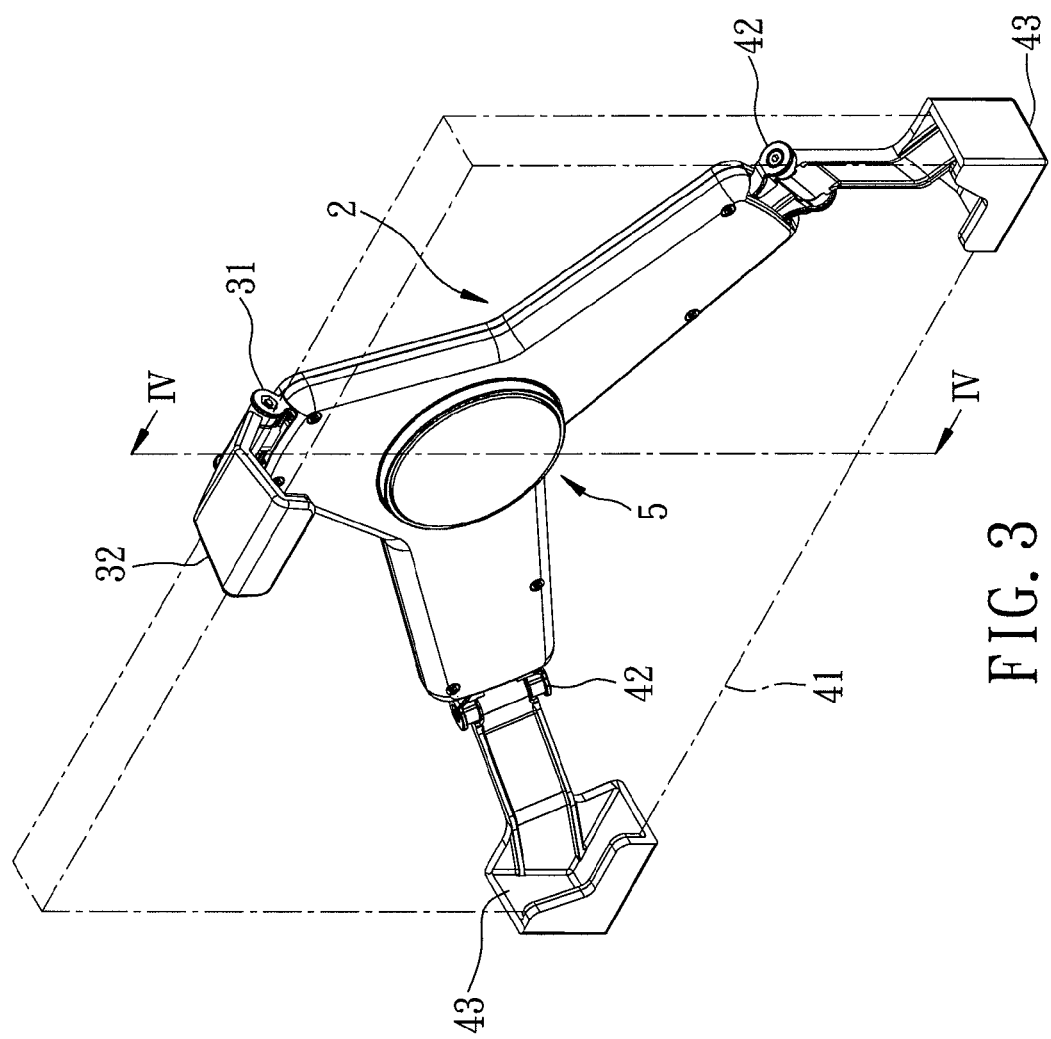
FIG. 3 is an assembled perspective view of the preferred embodiment illustrating a holding space adapted for holding a display.
Figure 4:
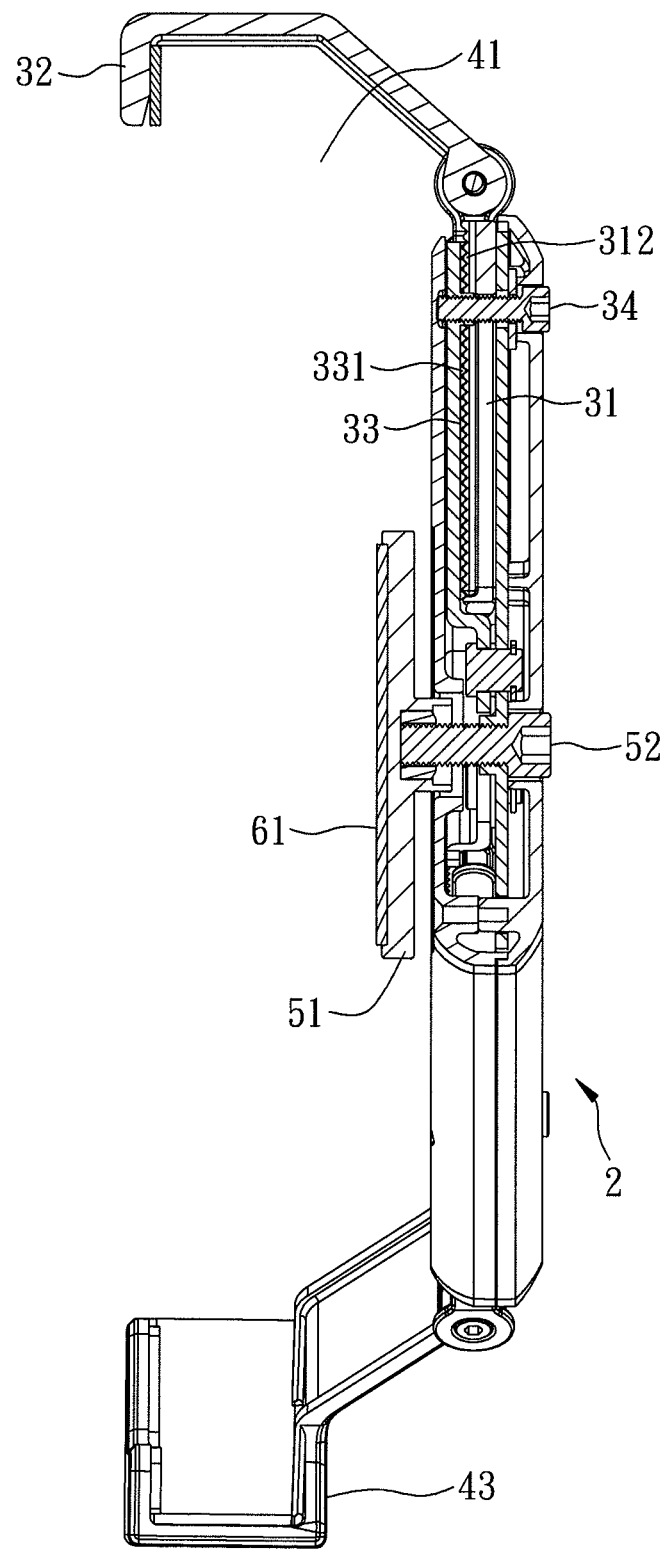
FIG. 4 is a sectional view of the preferred embodiment.
Figure 5:
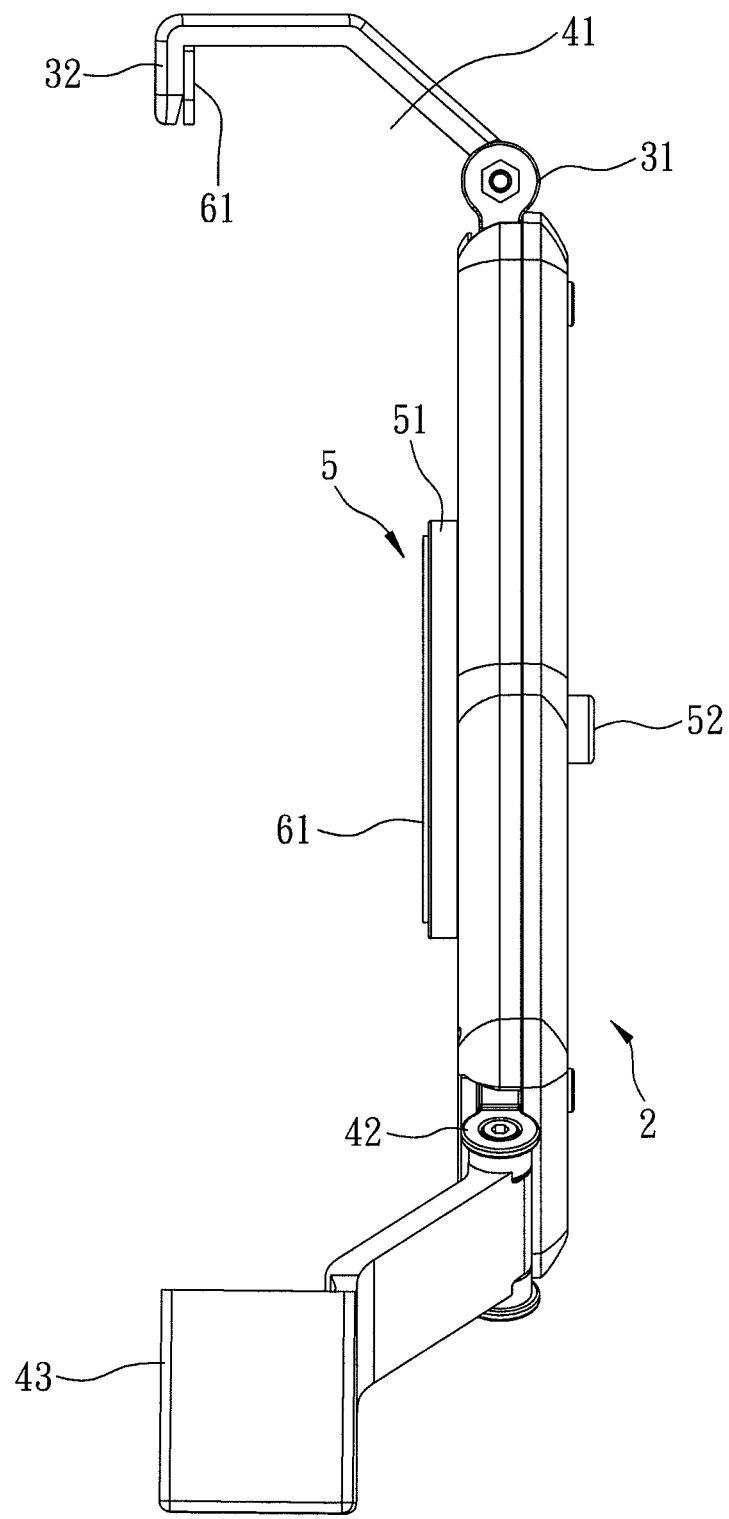
FIG. 5 is a side view of the preferred embodiment.
Figure 6:
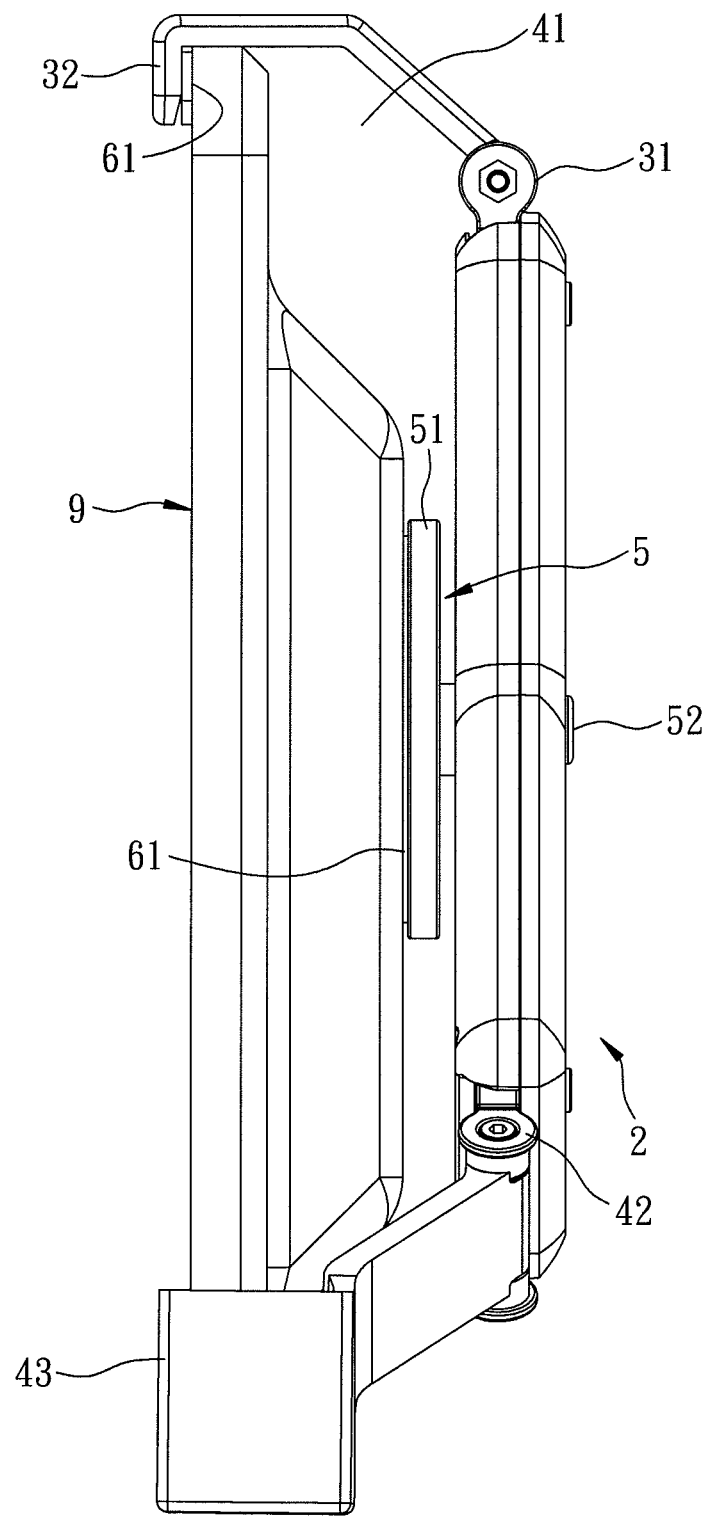
FIG. 6 is a side view of the preferred embodiment when holding the display.

As shown in FIGS. 2, 5 and 6, the abutment unit 5 includes an abutment member 51 that is disposed in the holding space 41 and that is adapted for abutting against the display 9, and an adjusting component 52 that is connected co-movably to the abutting member 51, that extends threadedly through the base 2, and that is rotatable so as to move relative to the base 2 in the front-rear direction.

The cushion unit 6 includes a plurality of cushion members 61 that are disposed respectively on the holding brackets 32, 43 and the abutment member 51, and that are adapted for cushioning the display 9.

Figure 7:
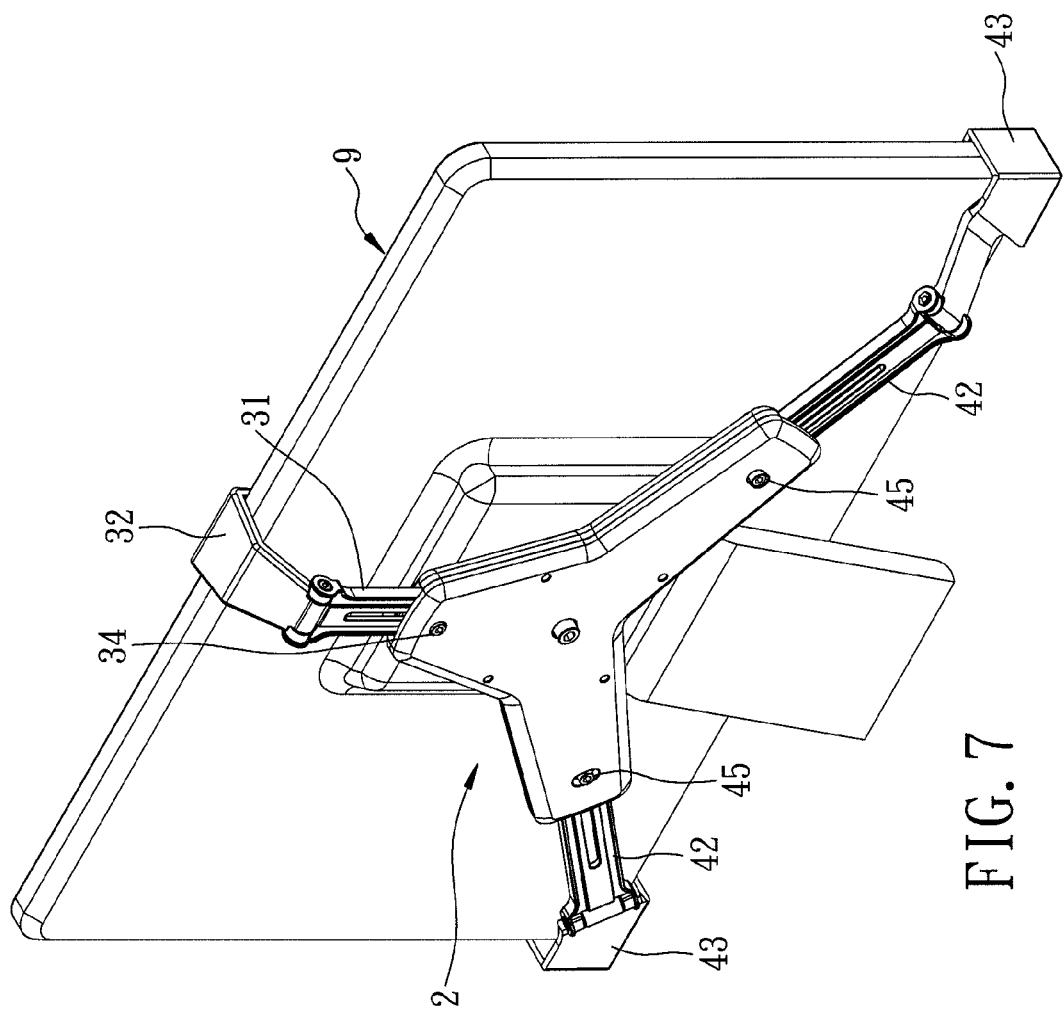
FIG. 7 is another perspective view of the preferred embodiment illustrating an upper holding arm and lower holding arms are in extended positions.
Figure 8:
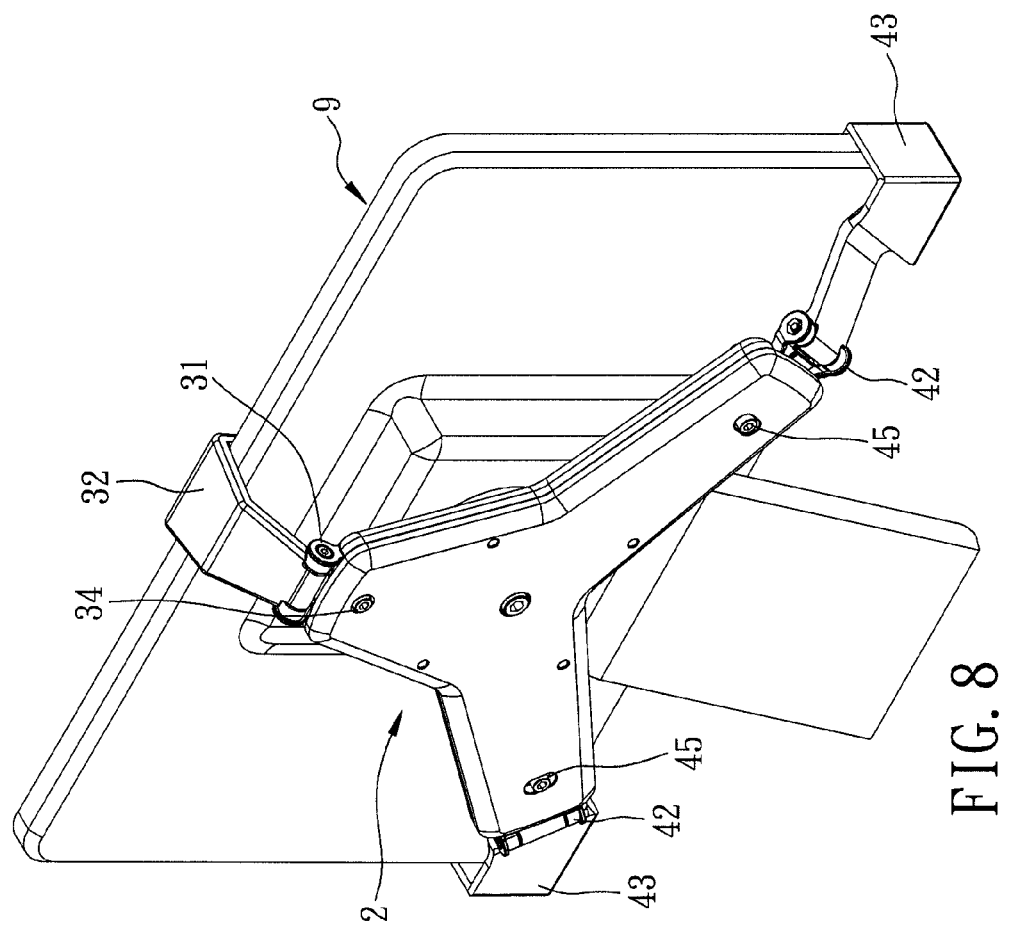
FIG. 8 is another perspective view of the preferred embodiment illustrating the upper and lower holding arms are in contracted positions.

As shown in FIG. 7, the holding device of the preferred embodiment can retain a 24" display 9 in the holding space 41 (see FIG. 5) when the upper and lower holding arms 31, 42 are in the extended positions. On the other hand, as shown in FIG. 8, the holding device can also retain a 19" display 9 in the holding space 41 (see FIG. 5) when the upper and lower holding arms 31, 42 are in the contracted positions.

In use, the movements of the upper and lower holding arms 31, 42 between the extended and retracted positions change the size of the holding space 41, thereby allowing the holding device of the present invention to be used with the displays 9 of varying sizes. Further, the rotation of the lower holding arms 42 allows the holding device to adjust the ratio of the length and width of the holding space 41 to fittingly retain the display 9. Still further, the engagements among the stop members 34, 45, the connecting arms 33, 44, the upper and lower holding arms 31, 42, and the base 2, in addition to the engagement between the engaging portions 441, 331 and the engaging parts 312, 422, enhance the holding stability of the holding device. Furthermore, by adjusting the abutment member 51 via the adjusting component 52, the holding device of the present invention can be applied to the displays 9 having different thicknesses.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A holding device adapted for holding a display, said holding device comprising:
   a base;
   an upper holding arm unit connected to an upper portion of said base; and
   a pair of lower holding arm units connected to a lower portion of said base, each of said lower holding arm units including a lower holding arm that is connected to said base and that is rotatable about an axis relative to said base between upper and lower positions, said lower holding arm of one of said lower arm units being moved toward said lower holding arm of the other one of said lower holding arm units during movement from the upper position to the lower position, said lower holding arm being movable relative to said base in a sliding direction transverse to the axis between an extended position to be distal from a center of said base and a contracted position to be proximate to the center of said base, each of said lower holding arm units further including a stop member that extends into said base and that is operable for positioning said lower holding arm relative to said base, said lower holding arm units being adapted for cooperating with said upper arm unit to define a holding space adapted for retaining the display;
   wherein each of said lower holding arm units further includes a connecting arm having a securing end that is rotatably connected to said base and registered with the axis, and an engaging portion that extends in the sliding direction;
   wherein said lower holding arm of each of said lower holding arm units has an engaging part that extends in the sliding direction and that engages slidably said engaging portion of said connecting arm of said lower holding arm unit; and
   wherein each of said engaging portions of said connecting arms and said engaging parts of said lower holding arms of said lower holding arm units has a plurality of engaging teeth.

2. The holding device as claimed in claim 1, wherein each of said lower holding arm units further includes a holding bracket pivotally connected to a distal end of said lower holding arm of said lower holding arm unit.

3. The holding device as claimed in claim 1, further comprising an abutment unit that includes an abutment member, which is disposed in said holding space and adapted for abutting against the display, and an adjusting component which is connected co-movably to said abutting member, which extends threadedly through said base, and which is rotatable so as to move relative to said base.

4. A holding device adapted for holding a display, said holding device comprising:
   a base;
   an upper holding arm unit connected to an upper portion of said base; and
   a pair of lower holding arm units connected to a lower portion of said base, each of said lower holding arm units including a lower holding arm that is connected to said base and that is rotatable about an axis relative to said base between upper and lower positions, said lower holding arm of one of said lower arm units being moved toward said lower holding arm of the other one of said lower holding arm units during movement from the upper position to the lower position, said lower holding arm being movable relative to said base in a sliding direction transverse to the axis between an extended position to be distal from a center of said base and a contracted position to be proximate to the center of said base, each of said lower holding arm units further including a stop member that extends into said base and that is operable for positioning said lower holding arm relative to said base, said lower holding arm units being adapted for cooperating with said upper arm unit to define a holding space adapted for retaining the display;
   wherein said bottom portion of said base is formed with a pair of adjusting grooves, each of said adjusting grooves having opposite upper and lower ends; and
   wherein said stop member of each of said lower holding arm units extends through a respective one of said adjusting grooves, and contacts said upper and lower ends of the respective one of said adjusting grooves when said lower holding arm of said lower holding arm unit is at the upper and lower positions, respectively.

5. The holding device as claimed in claim 4, wherein each of said lower holding arm units further includes a holding bracket pivotally connected to a distal end of said lower holding arm of said lower holding arm unit.

6. The holding device as claimed in claim 4, further comprising an abutment unit that includes an abutment member, which is disposed in said holding space and adapted for abutting against the display, and an adjusting component which is connected co-movably to said abutment member, which extends threadedly through said base, and which is rotatable so as to move relative to said base.

7. A holding device adapted for holding a display, said holding device comprising:
   a base;
   an upper holding arm unit connected to an upper portion of said base; and
   a pair of lower holding arm units connected to a lower portion of said base, each of said lower holding arm units including a lower holding arm that is connected to said base and that is rotatable about an axis relative to said base between upper and lower positions, said lower holding arm of one of said lower arm units being moved toward said lower holding arm of the other one of said lower holding arm units during movement from the upper position to the lower position, said lower holding arm being movable relative to said base in a sliding direction transverse to the axis between an extended position to be distal from a center of said base and a contracted position to be proximate to the center of said base, each of said lower holding arm units further including a stop member that extends into said base and that is operable for positioning said lower holding arm relative to said base, said lower holding arm units being adapted for cooperating with said upper arm unit to define a holding space adapted for retaining the display;
   wherein said upper holding arm unit includes an upper holding arm that is connected to said base and that is movable relative to said base in a sliding direction between an extended position to be distal from the center of said base and a contracted position to be proximate to the center of said base, and a stop member that extends into said base and that is operable for positioning said upper holding arm relative to said base;
   wherein said upper holding arm has a limiting groove extending in the corresponding sliding direction, said stop member of said upper holding arm unit extending into said upper portion of said base and through said limiting groove of said upper holding arm;
   wherein said lower holding arm of each of said lower holding arm units has a limiting groove extending in the corresponding sliding direction, said stop member of each of said lower holding arm units extending into said base and through said limiting groove of said lower holding arm unit; and
   wherein said connecting arm of each of said upper and lower holding arm units has a distal end formed with a threaded hole, said stop member of each of said upper and lower holding arm units engages threadedly said threaded hole of a corresponding one of said upper and lower holding arm units.

8. The holding device as claimed in claim 7, wherein:
   said upper holding arm unit further includes a connecting arm having a securing end that is rotatably connected to said base and registered with the axis, and an engaging portion that extends in the sliding direction; and
   said upper holding arm of said upper holding arm unit has an engaging part that extends in the sliding direction and that engages slidably said engaging portion of said connecting arm.

9. The holding device as claimed in claim 7, wherein said upper holding arm unit further includes a holding bracket pivotally connected to a distal end of said upper holding arm.

10. The holding device as claimed in claim 7, wherein each of said lower holding arm units further includes a holding bracket pivotally connected to a distal end of said lower holding arm of said lower holding arm unit.

11. The holding device as claimed in claim 7, further comprising an abutment unit that includes an abutment member, which is disposed in said holding space and adapted for abutting against the display, and an adjusting component which is connected co-movably to said abutment member, which extends threadedly through said base, and which is rotatable so as to move relative to said base.

* * * * *